(12) United States Patent
Dorward

(10) Patent No.: US 7,402,239 B2
(45) Date of Patent: *Jul. 22, 2008

(54) WATER PURIFICATION APPARATUS AND METHOD OF USING THE SAME

(75) Inventor: William Donald Charles Dorward, Bundall (AU)

(73) Assignee: Ionics Perpetual, Inc., Alexandria, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/112,005

(22) Filed: Apr. 22, 2005

(65) Prior Publication Data

US 2005/0284803 A1    Dec. 29, 2005

Related U.S. Application Data

(60) Continuation-in-part of application No. 11/046,714, filed on Feb. 1, 2005, which is a division of application No. 09/743,645, filed on Jan. 9, 2001, now Pat. No. 6,855,897.

(60) Provisional application No. 60/581,416, filed on Jun. 22, 2004, provisional application No. 60/564,570, filed on Apr. 23, 2004.

(51) Int. Cl.
    *B01D 17/12* (2006.01)
(52) U.S. Cl. .............. 210/96.1; 204/661; 204/665; 204/666; 210/143; 210/243; 210/258; 210/335; 210/192; 422/105; 422/186; 422/186.04

(58) Field of Classification Search ............ 210/85, 210/87, 97, 136, 198.1, 199, 243, 258, 259, 210/263, 266, 335, 416.1, 96.1, 143, 241, 210/337, 338, 416.3, 473, 764, 192; 204/660–665; 422/105, 186, 186.04
See application file for complete search history.

(56) References Cited

U.S. PATENT DOCUMENTS

| | | | |
|---|---|---|---|
| 3,092,566 A | * | 6/1963 | Negus .................... 204/240 |
| 3,308,254 A | | 3/1967 | McMahon et al. |
| 3,536,873 A | | 10/1970 | Miller et al. |
| 3,547,801 A | * | 12/1970 | Albright et al. ............ 204/272 |

(Continued)

FOREIGN PATENT DOCUMENTS

GB    1088427    12/1965

(Continued)

OTHER PUBLICATIONS

Derwent Abstract Accession No. 95-33952/43 RO109321-B, Jan. 30, 1995.

*Primary Examiner*—Joseph W Drodge
(74) *Attorney, Agent, or Firm*—Greenberg Traurig, LLP

(57) ABSTRACT

A water purification apparatus, comprising a water pump, wherein the water pump inlet port receives water from an external source, a nonreturn valve in fluid communication with the water pump outlet port, and an ionizer chamber in fluid communication with the nonreturn valve output end, wherein the ionizer chamber doses a bacteriacide into water contained in the ionizer chamber. The apparatus also includes a filter, wherein the input end of the filter is in fluid communication with the output end of the ionizer chamber.

25 Claims, 6 Drawing Sheets

U.S. PATENT DOCUMENTS

| | | | |
|---|---|---|---|
| 3,830,372 A * | 8/1974 | Manjikian | 210/321.63 |
| 3,943,044 A * | 3/1976 | Fenn et al. | 205/701 |
| 3,951,803 A * | 4/1976 | Siegel | 210/149 |
| 3,963,889 A | 6/1976 | Stonich | |
| 4,680,114 A * | 7/1987 | Hayes | 210/192 |
| 4,763,114 A | 8/1988 | Eidsmore | |
| 4,879,440 A | 11/1989 | Lymburger | |
| 4,981,594 A * | 1/1991 | Jones | 210/634 |
| 4,996,396 A | 2/1991 | Smith | |
| 5,064,534 A | 11/1991 | Busch et al. | |
| 5,070,220 A | 12/1991 | Glenn | |
| 5,114,571 A | 5/1992 | Pier et al. | |
| 5,120,437 A * | 6/1992 | Williams | 210/244 |
| 5,364,512 A * | 11/1994 | Earl | 210/138 |
| 5,534,145 A * | 7/1996 | Platter et al. | 210/90 |
| 5,589,066 A * | 12/1996 | Gray | 210/258 |
| 6,017,461 A * | 1/2000 | Garvey et al. | 210/748 |
| 6,495,052 B1 * | 12/2002 | Miyamoto et al. | 210/764 |
| 6,514,406 B1 * | 2/2003 | Katehis | 210/175 |
| 6,736,966 B2 * | 5/2004 | Herrington et al. | 210/192 |

FOREIGN PATENT DOCUMENTS

| | | |
|---|---|---|
| GB | 1563241 | 3/1980 |
| WO | WO 94/29228 | 12/1994 |
| WO | WO 95/16638 | 6/1995 |

* cited by examiner

SECTION A-A

WATER PURIFICATION APPARATUS AND METHOD OF USING THE SAME

RELATED APPLICATIONS

The instant application is a continuation in part of, and claims the benefit of, U.S. patent application Ser. No. 11/046,714, filed Feb. 1, 2005, which is a divisional of U.S. patent application Ser. No. 09/743,645, filed Jan. 9, 2001, now U.S. Pat. No. 6,855,897. The instant application is also related to, and claims the benefit of, U.S. Provisional Patent Application Ser. No. 60/564,570, filed Apr. 23, 2004, and U.S. Provisional Patent Application Ser. No. 60/581,416, filed Jun. 22, 2004. The teachings of these related applications are incorporated herein by reference in their entirety.

BACKGROUND OF THE INVENTION

The steady growth of tourism in remote areas has placed an undesirable burden on government authorities to provide facilities in such areas for the benefit of tourists and vacationers. By way of example, one facility frequently required by visitors is clean drinking water. Unfortunately, most water treatment apparatii are large and can have a significant impact on the local environment, both from a physical perspective and an aesthetic perspective. Clearly, the provision of such facilities can decrease the appeal of the wilderness and the ability of tourists and other visitors to visit these sites. Additionally, there are many areas which are so little used and so remote that government authorities are unable to provide and maintain the necessary facilities. Such facilities would also be subject to destruction and/or damage, such as by natural occurrences, vandals, and the like.

It is relatively well known that Ag+ ions, also referred to as "colloidal silver", in measured doses are toxic to lower life forms such as bacteria, but are not toxic to humans. In fact there is evidence available that colloidal silver provides significant benefits to the functioning of the human body and offers particular benefits to the immune system. Various apparatii have been used for dosing water with silver ions to take advantage of the bactericide effects of silver. However, in general, such apparatii have been used only in reticulated water systems, for example, where town water is connected.

SUMMARY OF THE INVENTION

The present invention is directed to a water purification apparatus and methods of using the same that substantially obviates one or more of the problems due to limitations and disadvantages of the related art. One embodiment of the present invention provides a light weight, compact, self contained, portable water treatment apparatus. Such an embodiment is particularly well suited for use by the military and/or first responders, both in the field and post incident. The water purification apparatus can also allow travelers and adventurers to sterilize and filter water from streams, water holes, puddles, dams and the like, thus converting it to potable water for drinking and living.

The invention has particular application to the treatment of water for human consumption and the destruction or removal of bacteria and microorganisms which are dangerous to human health. The invention can also remove terrorist introduced bacteria such as Anthrax, and viruses with a pore size greater than or approximately equal to that of small pox, such as, but not limited to, faecal coliform.

In one embodiment water from external sources enters the unit by way of a flexible tube, one end of which is connected to a hand pump associated with the unit. The water leaves the hand pump chamber and passes through a colloidal silver ionizer where effectively all the pathogenic bacteria are killed. The water can also pass through a filter, such as, but not limited to, a combination dual filter with sub-micronic rating. Such a filter should capable of stopping Anthrax spores and bacteria, faecal coliform bacteria, and virus groups with a pore size greater than or similar to small pox from passing through the filter. Such filtering can preferably be accomplished even at a flow rate in excess of 500 ml per minute. Although such a filter arrangement is preferred, it should be apparent to one skilled in the art that alternative filter arrangements, including increasing the number of filters or layers of filtering material, may be substituted therefor without departing from the spirit or the scope of the invention.

Light weight and small, one embodiment of the unit fits in a space smaller than two water bottles in a standard backpack, and offers a net weight decrease. An embodiment of the unit is also capable of operating at least two months without battery replacement. In still another embodiment, the filter assembly can be easily removed for cleaning after operating with dirty water sources.

Additional features and advantages of the invention will be set forth in the description which follows, and in part will be apparent from the description, or may be learned by practice of the invention. The objectives and other advantages of the invention will be realized and attained by the structure particularly pointed out in this written description as well as the appended drawings. It is to be understood that both the foregoing general description and the following detailed description are exemplary and explanatory and are intended to provide further explanation of the invention.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of at least one embodiment of the invention.

In the drawings.

DETAILED DESCRIPTION OF THE PREFERRED EMBODIMENT

Reference will now be made in detail to the preferred embodiments of the present invention, examples of which are illustrated in the accompanying drawings.

Colloidal silver is comprised of microscopic silver particles with a positive charge, i.e., Ag+ ions. In one embodiment, colloidal silver is pulled from a pure silver electrode immersed in contaminated water. The colloidal silver attaches to the contaminating particles to stabilize its charge, thus disabling the contamination and producing potable water. Drinking water containing colloidal silver is tasteless and odorless in small concentrations, and is not toxic to humans.

One embodiment of the present invention includes portable water treatment apparatii for treating water with colloidal silver, as shown by those embodiments illustrated in FIGS. 1 through 4, corresponding portions of which have been similarly numbered for reference. FIG. 4 shows various views of a high-strength, molded plastic that encases one embodiment of the apparatus. In the embodiment illustrated in FIGS. 1 through 4, the encasing is waterproof. The invention may be placed in a webbed pouch with attachment clips which are operatively connected to the body of the water treatment apparatus, thus simplifying the carrying of the water purifier.

Figure 1:
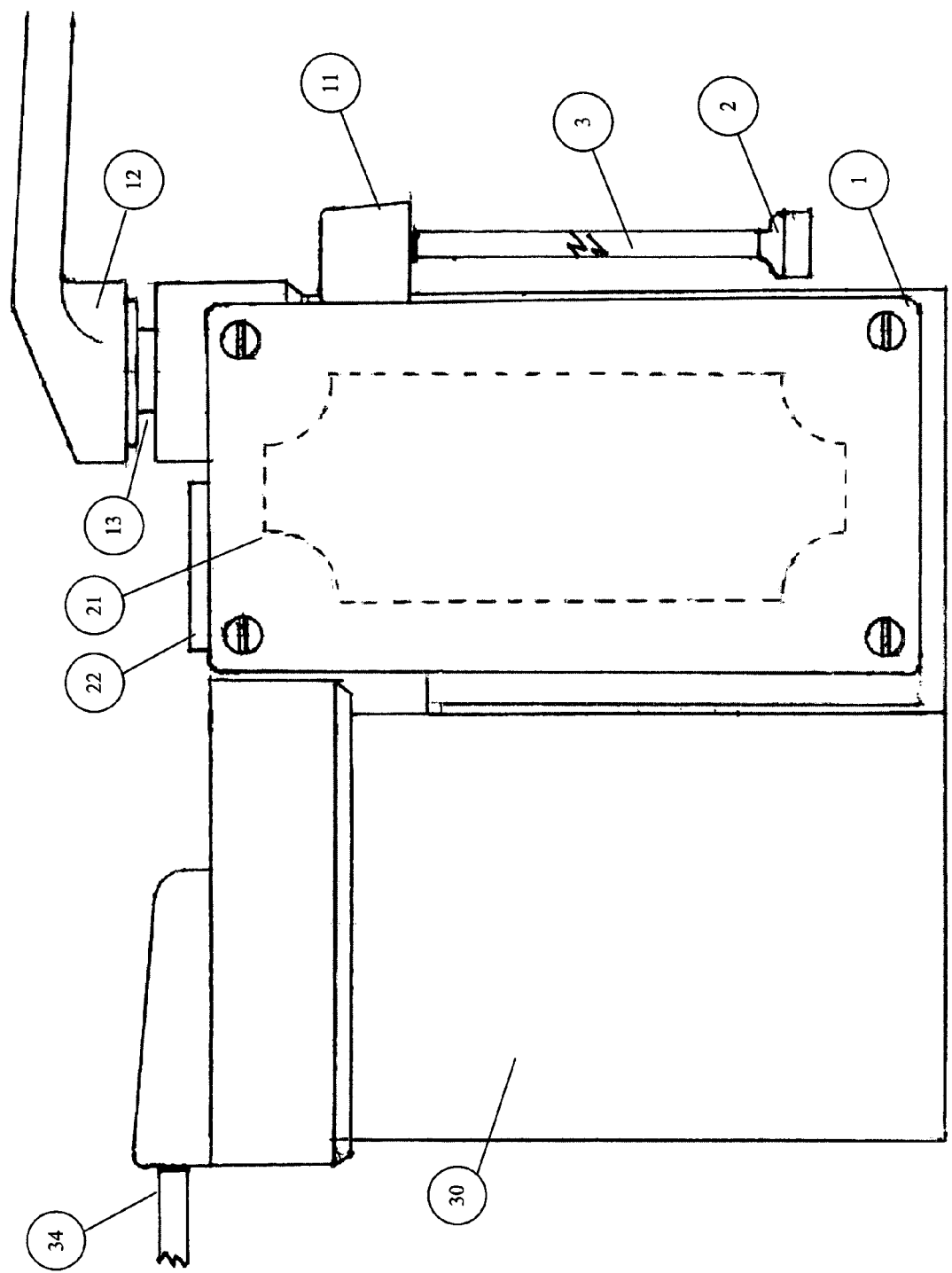
FIG. 1 is a front view according to an embodiment of the present invention.
Figure 2:
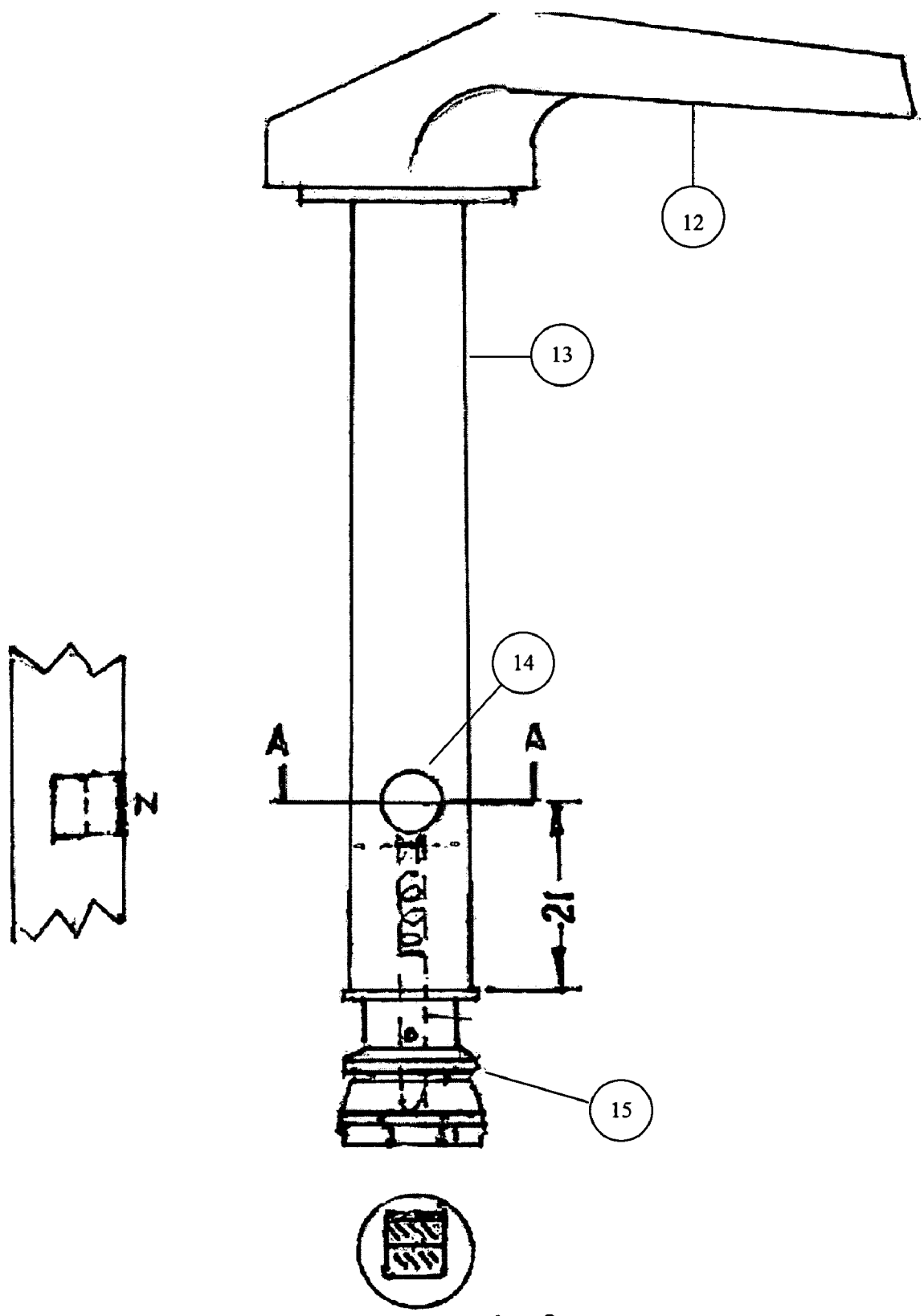
FIG. 2 is a detailed drawing of a pump handle and plunger assembly according to an embodiment of the present invention.
Figure 3:
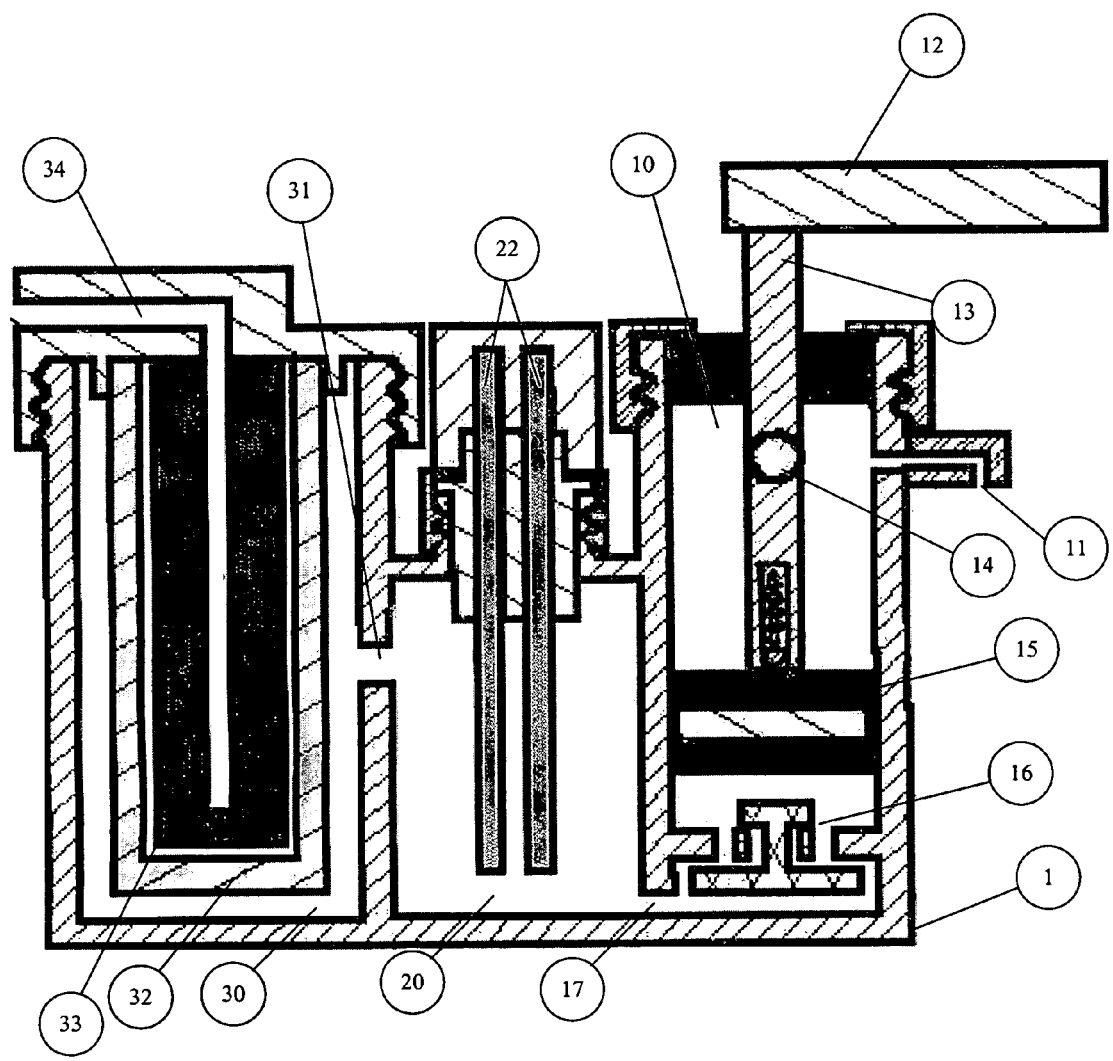
FIG. 3 is a cut-away of a unit, illustrating the various components contained therein.
Figure 4A:
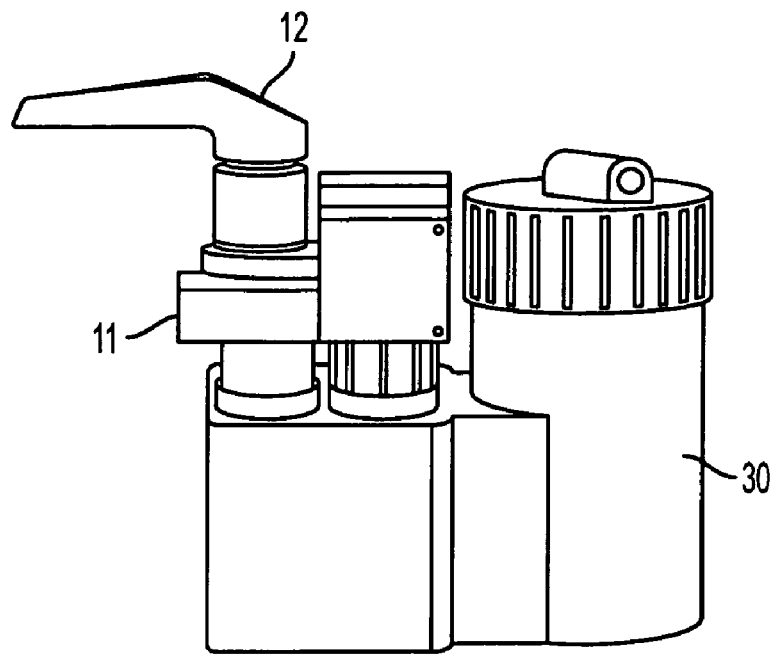
FIG. 4 provides various exterior views according to an embodiment of the invention.
Figure 4B:
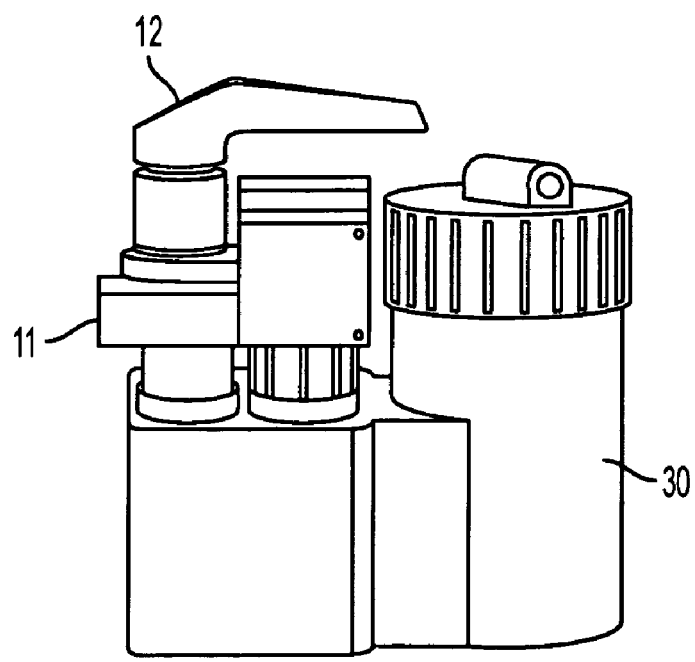
Figures 4C, 4D:
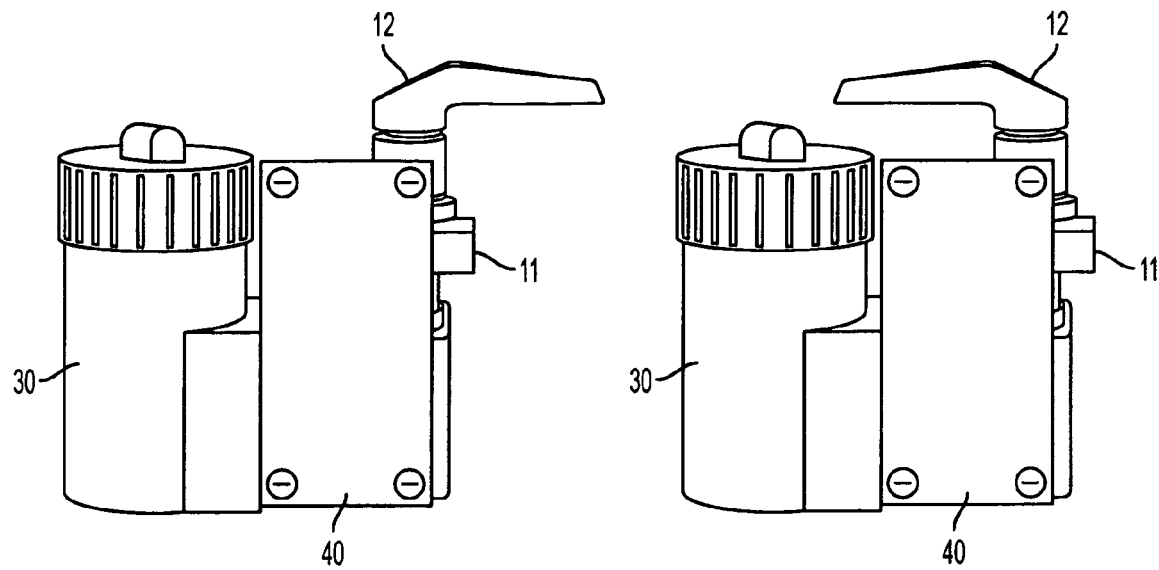
Figure 4E:
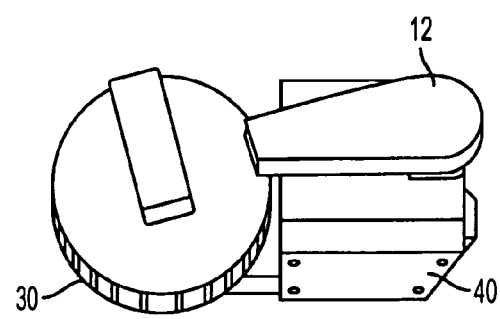

As illustrated in FIGS. 1 through 3, contaminated water enters the apparatus through water inlet 11 of pump chamber 10. Water inlet 11 can be coupled with a water source through a variety of means, including, without limitation, a piece of surgical or other tubing 3 inserted into the water source. Coupling means 3 and/or water inlet 11 can include strainer 2, which is the water preferably capable of filtering undesirably large solids from the water prior to the water entering the unit.

A user operates the unit by pumping pump handle 12. Pump handle 12 is operatively attached to the unit's housing 1, and should be positioned downstream of strainer 2. Pump shaft 13 can include an embedded magnet 14, such as, but not limited to, a rare earth magnet. Pump shaft 13 also has pump shaft control valve 15 attached thereto. Non-return valve 16 may be located at one end of pump chamber 10. Non-return valve 16 is an internal water passageway that preferably allows self-priming of the unit without allowing back flow of incoming, untreated water.

The water treatment apparatus can include a dosing means 22. In one embodiment, the dosing means consists of two silver electrodes, each having a 3 mm diameter. The dosing means may be located downstream of the hand pump, in ionizer chamber 20.

In one embodiment, dosing means 22 is managed by a control means 21. Control means 21 is illustrated in phantom in the embodiment of FIG. 1 as it is inside the encasing. Control means 21 allows dosing means 22 to discharge colloidal silver ions or another bacteriacide into the water at a variable strength. In an embodiment employing colloidal silver, the silver ion strength may be controlled based on a variety of inputs, including, but not limited to, the average water flow volume per stroke based on a mean pump stroke length or the electrical impedance of the water.

Figure 5:
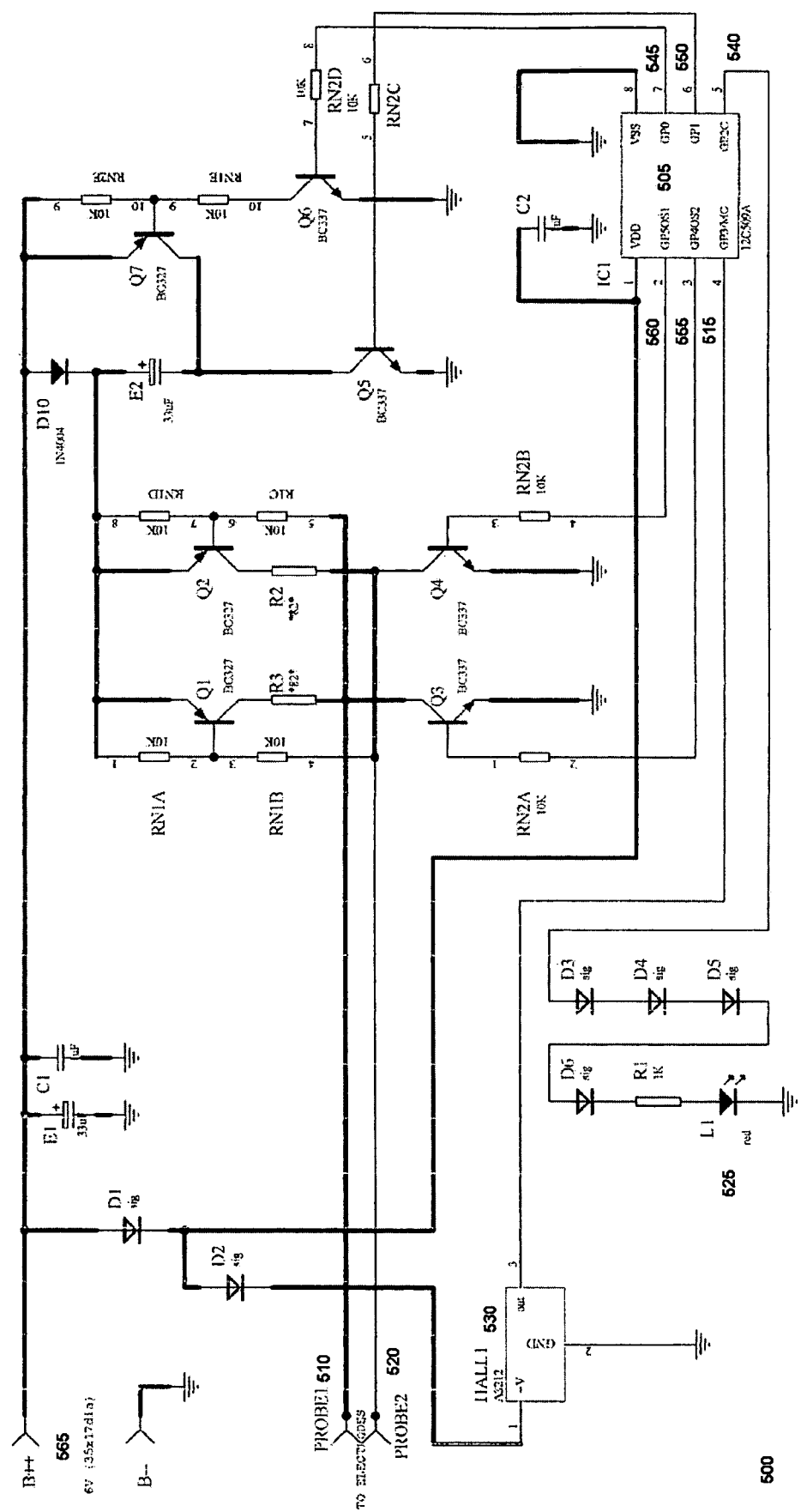
FIG. 5 is a circuit diagram according to an embodiment of the present invention.

In one embodiment, control means 21 can be triggered by the movement of magnet 14 past a Hall Effect sensor or other device (reference number 530 in FIG. 5). Although a Hall Effect sensor and magnet are described herein, it should be apparent to one skilled in the art that alternative emitters and sensors may be substituted therefor without departing from the spirit or the scope of the invention. By way of example, without intending to limit the present invention, photoreflective tape may be substituted for magnet 14, and an LED and optical sensor may be substituted for the Hall Effect sensor. As pump shaft 13 moves up and down, light from the LED is reflected by the photoreflective tape into the optical sensor, thereby triggering the sensor. The sensor can, in turn, trigger control means 21 to begin dosing the bacteriacide into the water. By allowing control means 21 to power down when the unit is not in use, the unit can conserve power.

In one embodiment, the unit is powered by a battery, such as a military battery type BA-5372U lithium battery. In an alternative embodiment, an electrical generator may be made by embedding or otherwise winding copper wire into the body of pump chamber 10. As pump shaft 13 moves within pump chamber 10, the magnet can induce current flow in the copper wire, thereby causing the unit to be powered. In still another embodiment, the unit may utilize battery power to initialize operation of control means 21 and dosing means 22, and switch to power generated by the movement of pump shaft 13 after a predetermined time or after the power generated thereby reaches a predetermined level. The power generated by the movement of pump shaft 13 may also be used to recharge the battery, power the LED, or for other purposes.

A watertight electronic control box 40 is preferably attached to the water treatment apparatus. The control box preferably contains an electronic circuit board which embodies control means 21, the above-described power supply, and the above-described Hall effect or other sensor.

Control box 40 also preferably includes a connection means for connecting the power supply to dosing means 22 and to the electronic circuit board. The electronic circuit board also preferably includes a means for disrupting or otherwise controlling mineral deposits on the silver ionizer electrodes, such as, but not limited to, the periodic input of a square wave across the electrodes.

In still another embodiment, ionization chamber 20 may also contain a waterproof ultraviolet light. Ultraviolet light has been shown to act as a bacteriacide, which can further enhance the effectiveness of the present invention.

FIG. 5 illustrates an electronic control circuit 500 according to an embodiment of the present invention. In an embodiment employing colloidal silver as a bacteriacide, microcontroller 505 creates an appropriate electric waveform applied to silver ionizer electrodes 510, 520 to deposit colloidal silver into the water. In conjunction with the embodiment illustrated in FIGS. 1 through 4, and as described above, as pump handle 12 is operated, pump shaft 13 moves up and down, along with magnet 14. Magnet 14 is whisked past magnetic sensor 530, which is positioned in close proximity to magnet 14's path. As magnet 14 passes sensor 530, sensor 530 sends a signal to input 515 of microcontroller 505 causing the microcontroller to "wake up", or activate. With microcontroller 505 active, output 540 of microcontroller 505 is switched on, which in turn enables an LED 525 and indicates the status of the apparatus.

Microcontroller outputs 545, 550 generate 10 kHz pulses that drive a voltage doubler circuit. The 10 kHz pulses are superimposed on the DC supply voltage. Microcontroller outputs 555, 560 drive a transistor bridge, changing the polarity of the electrodes on a periodic basis. In one embodiment, the polarity changes approximately every 1.2 seconds. If the magnet does not trigger Hall sensor 530 for more than three seconds, microcontroller 505 shuts down and goes into "sleep" mode to conserve power of a battery 565.

The colloidal silver ionizer circuit is a relatively simple design. The circuit in the illustrated embodiment takes advantage of the fact that water from sources encountered by the unit will typically have a high impedance, or low conductivity. As a result, a higher circuit output is required to produce enough colloidal silver to provide an effective bactericidal action for operations under these conditions. As such, a constant conductivity is not possible. Therefore, the output voltage applied across the silver varies with changing conductivity. Additionally, the microcontroller outputs are preferably not interrogable for security reasons.

The water treatment apparatus also preferably includes at least one multi-level filter, which may be downstream of the colloidal silver ionizer means. Such a filter is useful in removing sediment, as well as organisms of the protozoan group, such as, but not limited to, amoeba, Giardia, cryptosporidium, anthrax spores, faecal coliform bacteria, pathogenic bacteria, and viruses of pore size similar to small pox. In one embodiment, the first filter level is ceramic filter 32, which allows the filter to be scraped or otherwise cleaned, and any sediment to be removed in the event of dirt build up. This can obviate the need for a separate conventional sediment filter. The ceramic is preferably rated at 0.2 microns or less, thereby preventing the passage of protozoans and undesirable metal particulates, such as lead.

The multi-level filter is also preferably comprised of a second, inner filter 33 as part of the filter assembly. This second filter 33 is preferably capable of removing undesirable odors, tastes, and chemical pollutants such as, but not limited to, chlorine, trichloromethanes, herbicides, pesticides and the like. Inner filter 33 is preferably comprised of a carbon filter, and is preferably rated at 1 micron or smaller.

Although a single, multi-layer filter is presently preferred, it should be apparent to one skilled in the art that a plurality of filters may be substituted therefor without departing from the spirit or the scope of the invention.

It is presently preferred that the silver ion dosing means be located up-stream of the combination filter assembly. The silver dispensed by the dosing means is in such a high strength that it tends to kill pathogenic bacteria. By locating the combination filter down-stream of the silver ion dosing means, some of the silver ions may become lodged in the carbon filter, thus inhibiting the growth of harmful bacteria in the filter. The resultant silver ion strength is also preferably reduced by the carbon filter through absorption, such that the water that exits the water treatment apparatus complies with FDA limits.

The treated water exits the multi-level filter assembly through an outlet port 34. It is presently preferred that the apparatus include a non-return valve at the water exit point. This prevents a reverse flow of water and outside air, thereby further sealing the water treatment apparatus from outside contaminants.

The present invention also includes a method for using the water purification apparatus. Referring to FIG. 1, the method preferably begins with unstowing and rotating pump handle 12 through 180 degrees and pumping at a rate of approximately one stroke per minute. The pumping preferably causes an operating light, e.g., a LED, attached to the water purification apparatus to glow, thus providing feedback to the user that the apparatus is properly functioning. The pumping causes the contaminated water to be sucked through a strainer 2 and an inlet tube 3 into inlet 11. From inlet 11, the water is received in the body of the apparatus 10 and is pressurised by a pump control valve 15, which in turn pressurises the system. The pump plunger shaft assembly preferably contains magnet 14, which activates a silver ionizer circuit on an upward stroke.

Pressurised water leaves pump chamber 10 via a non-return valve 16 and flows through ionizer chamber 20 where it mixes with a concentration of bactericidal colloidal silver and kills pathogenic bacteria. The water exits ionizer chamber 20 and passes first through an outer filter 32. This outer filter preferably serves many functions, including, but not limited to, serving as a backup system, i.e., failsafe, to the silver ionization in the event of failure, serving as a barrier to stop Anthrax spores and organisms not killed by colloidal silver and serving as a unique and fully serviceable dirt and sediment filter barrier. The water then passes through an inner filter 32, where all chlorine, bad tastes and smells are preferably eliminated. The treated water exits the filters and passes though a tube connected to another non-return valve. As described above, this non-return valve prevents reverse flow and mixing with potentially contaminated outside air. The resulting water tastes good and is very potable.

While the invention has been described in detail and with reference to specific embodiments thereof, it will be apparent to those skilled in the art that various changes and modifications can be made therein without departing from the spirit and scope thereof. Thus, it is intended that the present invention cover modifications and variations of this invention as well.

I claim as my invention:

1. A portable water purification apparatus, comprising:
   a hand operated water pump comprising a handle, the water pump having an inlet port and an outlet port, the water pump inlet port receiving water from an external source, the handle being rotatable from a stowage position to an operating movement;
   a nonreturn valve, wherein the nonreturn valve has an input end and an output end, wherein the nonreturn valve input end is in fluid communication with the water pump outlet port;
   an ionizer chamber, wherein the ionizer chamber has an inlet port and an outlet port, wherein the ionizer chamber inlet port is in fluid communication with the nonreturn valve output end;
   an ionizer control means which controls dosing of a bacteriacide into water contained in the ionizer chamber by applying an electrical current to the bacteriacide, the ionizer being activated upon a handle movement; and,
   a filter, wherein the filter has an input end and an output end, wherein the input end of the filter is in fluid communication with the outlet port of the ionizer chamber.

2. The apparatus of claim 1, wherein the ionizer control means determines the amount of bacteriacide to be dosed into the water in the ionizer chamber based on the impedance of the water in the ionizer chamber.

3. The apparatus of claim 1, the water pump operating via a stroking type of manual control, each stroke of the water pump handle causing the water pump to push a volume of water through the water pump outlet port, the ionizer control means determining the amount of bacteriacide to be dosed into the water based on the average volume per stroke.

4. The apparatus of claim 1, wherein the bacteriacide is colloidal silver.

5. The apparatus of claim 4, wherein the ionizer control means controls dosing of the colloidal silver by applying an electrical current to at least one silver bar.

6. The apparatus of claim 4, wherein the ionizer control means determines the amount of colloidal silver to be dosed into the water in the ionizer chamber based on the impedance of the water in the ionizer chamber.

7. The apparatus of claim 4, the water pump operating via a stroking type of manual control, each stroke of the water pump handle causing the water pump to push a volume of water through the water pump outlet port, the ionizer control means determining the amount of bacteriacide to be dosed into the water based on the average volume per stroke.

8. The apparatus of claim 1, wherein the ionizer control means controls dosing of the colloidal silver by applying an electrical current to at least one silver bar, and wherein the ionizer control means determines the amount of colloidal silver to be dosed into the water based on the impedance of the water.

9. The apparatus of claim 1, wherein the filter is a multi-stage filter.

10. The apparatus of claim 9, wherein the multi-stage filter has a sub-micron rating.

11. The apparatus of claim 9, wherein at least one stage of multi-stage filter is comprised of a ceramic filter.

12. The apparatus of claim 9, at least one stage of the multi-stage filter is comprised of a charcoal filter.

13. The apparatus of claim 9, wherein the multi-stage filter has a sub-micron rating, wherein at least one stage of the multi-stage filter is comprised of a ceramic filter, and wherein at least one stage of the multi-stage filter is comprised of a charcoal filter.

14. The apparatus of claim 1, wherein the filter is a two stage filter.

15. The apparatus of claim 14, wherein a first stage of the two stage filter is a ceramic filter, and a second stage of the two stage filter is a charcoal filter.

16. The apparatus of claim 15, wherein the charcoal filter stage is located nearest the outlet end of the filter.

17. The apparatus of claim 1 further comprising a strainer, wherein the strainer has a first end and a second end, and a tube, wherein the tube has a first end and a second end, wherein the first end of the tube is connected to the water pump inlet port and the second end of the tube is connected to the first end of the strainer.

18. The apparatus of claim 1, the electrical current being supplied only when the water pump is being operated.

19. The apparatus of claim 18, operation of the water pump being detected by the movement of an emitter past a sensor as the water pump operates.

20. The apparatus of claim 19, the emitter comprising a magnet and the sensor comprising a Hall effect sensor.

21. The apparatus of claim 19, the emitter comprising a light emitting diode and the sensor comprising a photo sensor.

22. A portable water purification apparatus, comprising:
a hand operated water pump comprising a handle, the water pump having an inlet port and an outlet port, the water pump inlet port receiving water from an external source, the handle being rotatable from a stowage position to an movement;
a strainer, the strainer having a first end and a second end;
a tube, the tube having a first end and a second end, the first end of the tube being connected to the water pump inlet port and the second end of the tube being connected to the first end of the strainer;
a nonreturn valve, the nonreturn valve having an input end and an output end, the nonreturn valve input end being in fluid communication with the water pump outlet port;
an ionizer chamber, the ionizer chamber having an inlet port and an outlet port, the ionizer chamber inlet port being in fluid communication with the nonreturn valve output end;
an ionizer control means which controls dosing of colloidal silver into water contained in the ionizer chamber by applying an electrical current to a silver electrode, the ionizer receiving the electrical current from a power supply only when the handle is in the operating position being activated upon a handle movement; and,
a multi-stage filter, the multi-stage filter having an input end and an output end, the input end of the multi-stage filter being in fluid communication with the outlet port of the ionizer chamber.

23. The apparatus of claim 22, the ionizer control means determining the amount of colloidal silver to be dosed into the water in the ionizer chamber based on the impedance of the water in the ionizer chamber.

24. The apparatus of claim 22, the water pump operating via a stroking type of manual control, each stroke of the water pump handle causing the water pump to push a volume of water through the water pump outlet port, and the ionizer control means determining the amount of colloidal silver to be dosed into the water based on the average volume per stroke.

25. The apparatus of claim 22, wherein at least one stage of the multi-stage filter comprises one of a ceramic filter and a charcoal filter.

* * * * *